US008514231B2

(12) United States Patent
Kim et al.

(10) Patent No.: US 8,514,231 B2
(45) Date of Patent: Aug. 20, 2013

(54) DISPLAY APPARATUS FOR DETERMINING ERROR IN DISPLAY IDENTIFICATION DATA AND CONTROL METHOD OF THE SAME

(75) Inventors: Tai-gyu Kim, Suwon-si (KR); Young-chan Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1078 days.

(21) Appl. No.: 12/100,604

(22) Filed: Apr. 10, 2008

(65) Prior Publication Data

US 2008/0300815 A1 Dec. 4, 2008

(30) Foreign Application Priority Data

May 31, 2007 (KR) ........................ 10-2007-0053122

(51) Int. Cl.
*G06F 15/00* (2006.01)
*G06T 1/00* (2006.01)
*G09G 5/36* (2006.01)

(52) U.S. Cl.
USPC .......................................... 345/501; 345/556

(58) Field of Classification Search
USPC .................................................. 345/501, 556
See application file for complete search history.

(56) References Cited

U.S. PATENT DOCUMENTS 4,727,544 A 2/1988 Brunner et al.
6,750,857 B2 6/2004 Bae et al.
7,414,619 B2 8/2008 Kim
8,214,730 B2 7/2012 Masumori
2004/0027515 A1* 2/2004 Itakura .......................... 349/110
2004/0119731 A1* 6/2004 Lee .............................. 345/699
2005/0062735 A1 3/2005 Kim
2007/0057931 A1* 3/2007 Takamori ...................... 345/204

FOREIGN PATENT DOCUMENTS

CN 1385787 A 12/2002
CN 1601497 A 3/2005
DE 101 53 659 A1 5/2003
EP 1 256 922 A1 11/2002
JP 2003-259241 A 9/2003
KR 10-2005-0029615 A 3/2005

OTHER PUBLICATIONS

Chinese Office Action issued Aug. 11, 2011 by the State Intellectual Property Office of P.R. China in counterpart Chinese Patent Application No. 200810097494.4.

Communication dated Mar. 15, 2012 issued by the State Intellectual Property Office of P.R. China in corresponding Chinese Application No. 200810097494.4.

Communication dated Jun. 27, 2013 issued by the Korean Intellectual Property Office in counterpart Korean Patent Application No. 10-2007-0053122.

* cited by examiner

*Primary Examiner* — Aaron M Richer
*Assistant Examiner* — Robert Craddock
(74) *Attorney, Agent, or Firm* — Sughrue Mion, PLLC

(57) ABSTRACT

A display apparatus includes a storage unit which stores a display identification data and a comparative check data obtained from the display identification data by a preset data processing method; and a controller which calculates an inspective check data from the display identification data stored in the storage unit via the data processing method, compares the inspective check data with the comparative check data, and performs an identification data checking process to determine whether there is an error in the display identification data.

22 Claims, 9 Drawing Sheets

DISPLAY APPARATUS FOR DETERMINING ERROR IN DISPLAY IDENTIFICATION DATA AND CONTROL METHOD OF THE SAME

CROSS-REFERENCE TO RELATED APPLICATIONS

This application claims priority from Korean Patent Application No. 10-2007-0053122, filed on May 31, 2007 in the Korean Intellectual Property Office, the disclosure of which is incorporated herein in its entirety by reference.

BACKGROUND OF INVENTION

1. Field of Invention

Apparatuses and methods consistent with the present invention relate to a display apparatus and a control method thereof, and more particularly, to a display apparatus which stores a display identification data and a control method thereof.

2. Description of the Related Art

As a display apparatus which includes a liquid crystal display (LCD) panel becomes widespread, interface between the display apparatus and an image source increasingly adopts a digital interface type instead of a related art analog interface type. Most display apparatuses which are currently made adopt a digital interface of a digital video interface (DVI) type which uses a transition minimized differential signaling (TMDS) technology as a digital interface standard provided by a digital display working group (DDWG).

The display apparatus transmits display identification data to an external device via a DVI connector, when the DVI connector is connected to the external device which includes a graphic card. Here, a communication method of the display apparatus transmitting the display identification data to an image source is referred to as a display data channel (DDC). The DDC is to perform an automatic configuration, e.g., a plug-and-play, on a video display system.

A display identification data is stored in a memory when the display apparatus is manufactured, and a protection function is set up for the memory so that the display identification data is not damaged. The protection function does not allow a new data to be written in the memory. However, if a hardware problem occurs, e.g., a power state in the image source or the display apparatus is not normal, or a software problem occurs, e.g., an error occurs in the display apparatus, the protection function does not perform properly. Thus, a data from an external apparatus may be stored in the memory which lost the protection function, and the display identification data may be deleted or transformed.

If the foregoing problems occur, a video signal is not normally displayed on the display apparatus and a user may not even recognize the errors generated in the display apparatus.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, it is an aspect of the present invention to provide a display apparatus which is capable of easily determining whether an error occurs in display identification data and a control method of the same.

Another aspect of the present invention is to provide a display apparatus which easily notifies a user of an error if the error occurs in display identification data and a control method of the same.

Still another aspect of the present invention is to provide a display apparatus which recovers display identification data where an error occurs and a control method of the same.

Additional aspects of the present invention will be set forth in part in the description which follows and, in part, will be obvious from the description, or may be learned by practice of the present invention.

The foregoing and/or other aspects of the present invention can be achieved by providing a display apparatus including: a storage unit which stores a display identification data and a comparative check data obtained from the display identification data by a preset data processing method; and a controller which calculates an inspective check data from the display identification data stored in the storage unit via the data processing method, compares the inspective check data with the comparative check data, and performs an identification data checking process to determine whether there is an error in the display identification data.

According to an aspect of the invention, the display apparatus further includes an external apparatus connecting part where an external apparatus to supply a digital video signal is connected, wherein the controller blocks the external apparatus from access to a data in the storage unit via the external apparatus connecting part when the identification data checking process starts.

According to an aspect of the invention, the display apparatus further includes an external apparatus connecting part where an external apparatus to supply an analog video signal is connected, wherein the controller provides a data in the storage unit to the external apparatus via the external apparatus connecting part.

According to an aspect of the invention, the display apparatus further includes a user input unit for input of an error check, wherein the controller performs the identification data checking process if an error checking command is input through the user input unit.

According to an aspect of the invention, the controller determines whether there is an error in the display identification data every predetermined period.

According to an aspect of the invention, the display apparatus further includes a display; and a user interface generating unit which generates a user interface information to be displayed on the display, wherein the controller controls the user interface generating unit to display a result from the identification data checking process on the display.

According to an aspect of the invention, the display apparatus further includes an additional storage unit which stores the display identification data and the comparative check data, wherein the controller stores the display identification data and the comparative check data which are stored in the additional storage unit in the storage unit if determined that an error occurs in the display identification data.

According to an aspect of the invention, the controller blocks the external apparatus from access to the additional storage unit.

According to an aspect of the invention, the display apparatus further includes an additional storage unit which stores the display identification data and the comparative check data, wherein the controller compares the display identification data in the storage unit with the display identification data in the additional storage unit and determines whether an error occurs in the display identification data.

According to an aspect of the invention, the comparative check data includes a checksum.

According to an aspect of the invention, the display identification data includes an extended display identification data (EDID).

The foregoing and/or other aspects of the present invention can be achieved by providing a display apparatus including: a display; a first storage unit which stores a display identification data and a comparative check data obtained from the display identification data by a preset data processing method; a second storage unit which backs up the display identification data and the comparative check data; and a controller which performs an identification data checking process to determine whether there is an error in the display identification data stored in the first storage unit, and stores the display identification data and the comparative check data backed up in the second storage unit in the first storage unit if the error occurs.

According to an aspect of the invention, the display apparatus further includes an external apparatus connecting part where an external apparatus to supply a video signal is connected, wherein the controller blocks the external apparatus from access to the second storage unit.

According to an aspect of the invention, the external apparatus connecting part provides a digital video signal, and the controller blocks the external apparatus from access to the first storage unit when the identification data checking process starts.

According to an aspect of the invention, the controller calculates an inspective check data from the display identification data stored in the first storage unit via the data processing method, and compares the inspective check data with the comparative check data to inspect whether there is an error in the display identification data.

According to an aspect of the invention, the display apparatus further includes a user interface generating unit which generates a user interface information to be displayed on the display, wherein the controller controls the user interface generating unit to display a result from the identification data checking process on the display.

The foregoing and/or other aspects of the present invention can be achieved by providing a display apparatus including: a display; a storage unit which stores a display identification data; a user interface generating unit which generates a user interface information to be displayed on the display; and a controller which determines whether there is an error in the display identification data stored in the storage unit, and controls the user interface generating unit to display a result from determining whether an error occurs in the display identification data on the display.

According to an aspect of the invention, the display apparatus further includes an additional storage unit which stores the display identification data and the comparative check data, wherein the controller stores the display identification data and the comparative check data which are stored in the additional storage unit in the storage unit if determined that the error occurs in the display identification data.

The foregoing and/or other aspects of the present invention can be achieved by providing a control method of a display apparatus which includes a storage unit which stores a display identification data and a comparative check data obtained from the display identification data by a preset data processing method and a display, including: calculating an inspective check data from the display identification data via a preset data processing method, and checking the identification data which compares the inspective check data and the comparative check data to determine whether an error occurs in the display identification data.

According to an aspect of the invention, the checking of the identification data is performed every predetermined period.

According to an aspect of the invention, the control method further includes generating a user interface information so that a result from the checking of the identification data is displayed on the display.

According to an aspect of the invention, the control method further includes backing up the display identification data and the comparative check data before the calculating the inspective check data, and storing the backup display identification data and comparative check data in the storage unit if determined that the error occurs in the display identification data.

According to an aspect of the invention, the display apparatus further includes an external apparatus connecting part where an external apparatus to supply a digital video signal is connected, the control method further including blocking the external apparatus from access to the storage unit.

According to an aspect of the invention, the control method further includes generating a user interface information so that a result from the checking the identification data is displayed on the display.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF

The Present Invention

Figure 1:
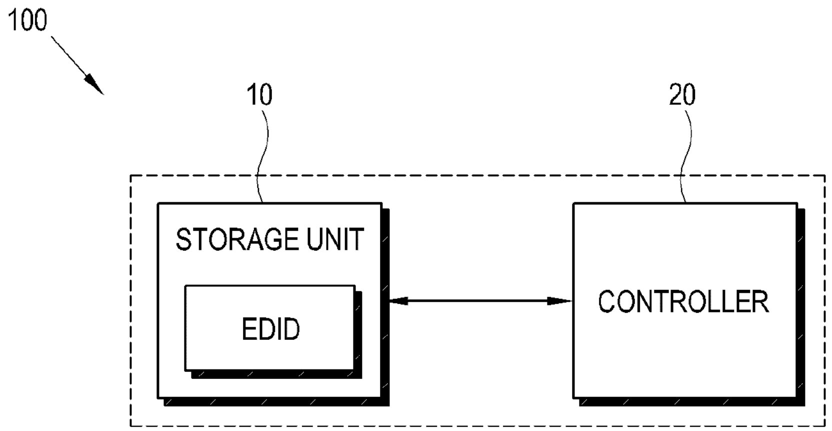
FIG. 1 is a control block diagram of a display apparatus according to a first exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Referring to FIG. 1, a display apparatus 100 according to a first exemplary embodiment of the present invention includes a storage unit 10 and a controller 20.

The storage unit 10 stores a display identification data and a comparative check data obtained from the display identification data by a preset data processing method. The display identification data may include an extended display identification data (EDID) such as a manufacturer/manufactures identification (ID) of a display apparatus, specifications of a display apparatus and support timing. The display apparatus 100 supplies the display identification data stored in the storage unit 10 to an external apparatus, if the external apparatus which supplies a video source requests the display identification data.

A comparative check data refers to a checksum to inspect errors of one form of redundancy check to detect errors in data. In other words, a comparative check data is a value obtained by processing a data corresponding to a display identification data according to a preset data processing method e.g., logical product, logical sum, exclusive logical sum, or the like.

The storage unit 10 may include a non-volatile memory in the display apparatus 100, e.g., an electrically erasable and programmable read-only memory (EEPROM), a programmable read-only memory (PROM), a micro control unit (MCU), etc.

The controller 20 has access to the display identification data stored in the storage unit 10 by a communication method and reads out the display identification data to perform an identification data checking process to determine whether there is an error in the display identification data. The controller 20 calculates an inspective check data via the foregoing data processing method, and compares the inspective check data with the comparative check data to determine whether they are the same. The controller 20 determines that the display identification data is normal if the inspective check data matches the comparative check data. On the other hand, the controller 20 determines that there is an error in the display identification data if the inspective check data does not correspond to the comparative check data. The controller 20 may determine whether an error occurs in the display identification data every predetermined period, and accordingly it may further include an inspective signal outputting unit which outputs an inspective signal to perform the identification data checking process periodically. If the identification data checking process is performed every predetermined period, it is easily determined whether an error occurs in the display identification data, thereby improving a display configuration of a video signal.

Also, if errors such as malfunction of power supply or a communication disturbance generated outside the display apparatus 100 occur, the display apparatus 100 may further include a sensor which detects the foregoing error, thereby performing the identification data checking process.

Figure 2:
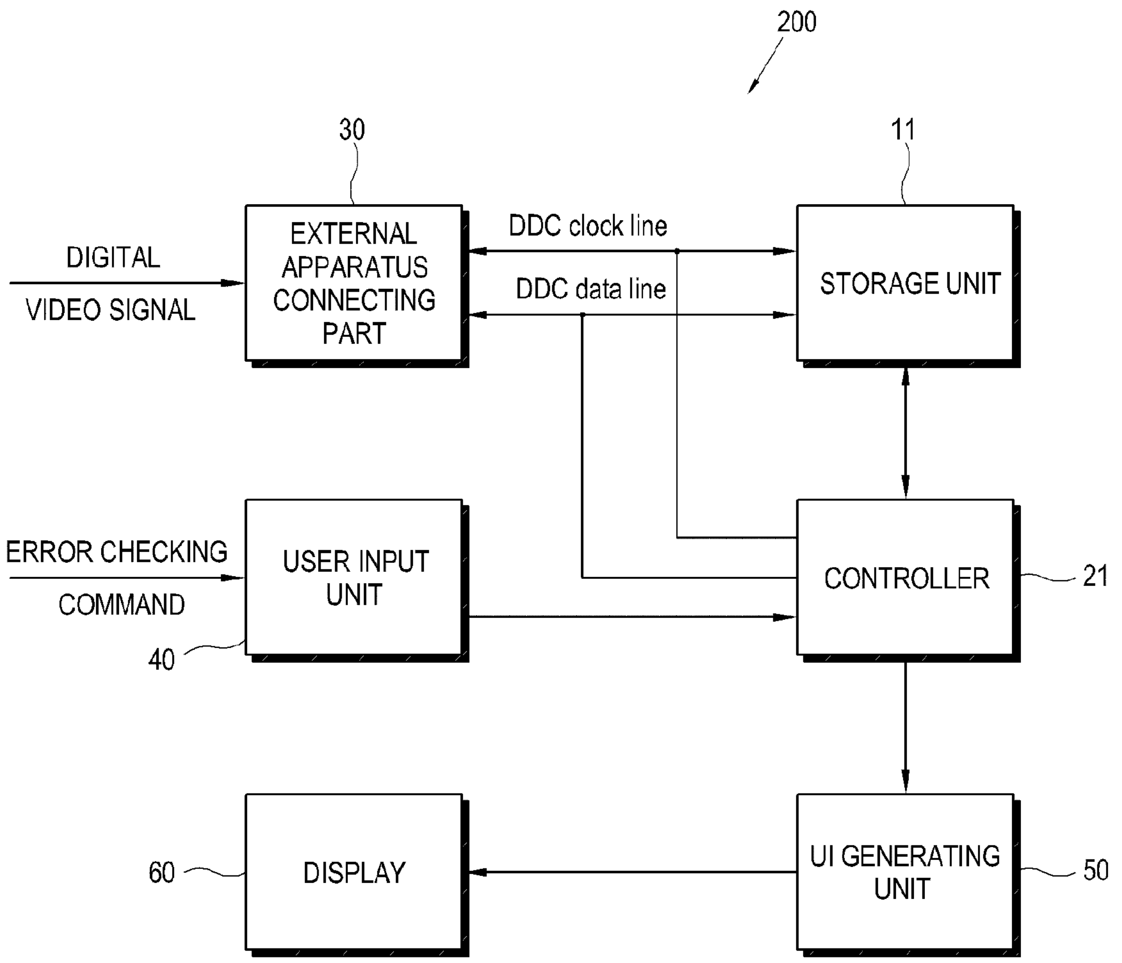
FIG. 2 is a control block diagram of a display apparatus according to a second exemplary embodiment of the present invention.
Figure 3:
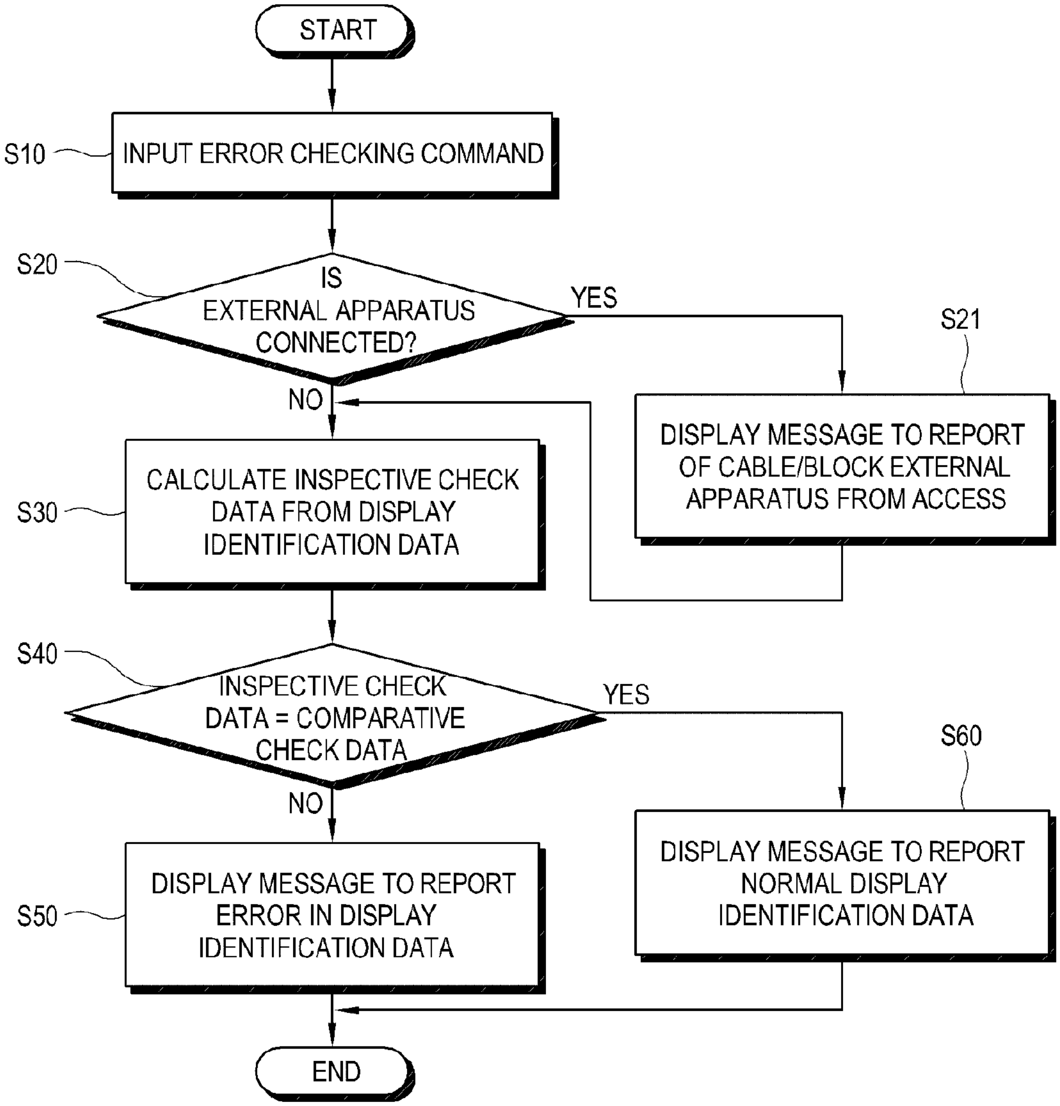
FIG. 3 is a flow chart illustrating a control method of the display apparatus according to the second exemplary embodiment of the present invention.

FIG. 2 is a control block diagram of a display apparatus according to a second exemplary embodiment of the present invention and FIG. 3 is a flow chart illustrating a control method of the display apparatus according to the second exemplary embodiment of the present invention.

Referring to FIGS. 2 and 3, the display apparatus 200 according to the present exemplary embodiment includes an external apparatus connecting part 30, a user input unit 40, a user interface (UI) generating unit 50 and a display 60 in addition to a storage unit 11 and a controller 21. It should be noted that the storage unit 11 and the controller 21 will not be explained repeatedly, which have the same features as those in the first exemplary embodiment.

The external apparatus connecting part 30 includes a connector where an external apparatus (not shown) to apply a video signal is connected, and an interface between the external apparatus and the display apparatus 200. In the present exemplary embodiment, a video signal which is input via the external apparatus connecting part 30 is a digital video signal, and the display apparatus 200 adopts a digital video interface (DVI) type which uses a transition minimized differential signaling (TMDS) technology as a digital interface standard provided by a digital display working group (DDWG). Thus, the external apparatus connecting part 30 may include a digital visual interface-digital and analog (DVI-I) connector, a digital visual interface-digital only (DVI-D) connector or a high definition multimedia interface (HDMI) connector, which employ a DVI type.

According to a display data channel (DDC) communication standard to transmit a display identification data to the external apparatus, if a data is exchanged between the external apparatus and the display apparatus 200, a signal line and an order to exchange a data is provided. A DDC data line which is a bidirectional serial data line, and a DDC clock line which is a serial clock line used as a clock, are used for signal lines in the DDC communication. An external apparatus which supplies a digital video signal requests a display identification data in the storage unit 11 through the external apparatus connecting part 30, or directly reads out a display identification data from the storage unit 11. That is, as shown in FIG. 2, the external apparatus connecting part 30 and the storage unit 11 may communicate with each other via the DDC data line and the DDC clock line independently without control by an external apparatus.

The user input unit 40 is provided to input an error check. A user outputs an error checking command to the controller 21 through the user input unit 40 if power supply of an external apparatus malfunctions or a video signal is not properly displayed on the display apparatus 200. Further, the user may set up the controller 21 to perform an identification data checking process periodically via the user input unit 40.

The user input unit 40 includes a shortcut key provided outside the display apparatus 200 or a hidden key provided therein. The user input unit 40 includes a signal processor (not shown) which receives and processes an input control signal via the shortcut key or the hidden key and outputs the control signal to the controller 21 as an error checking command.

The UI generating unit 50 generates a UI information which shows a result from an identification data checking process of the controller 21, and displays the UI information on the display 60.

The display 60 displays a video signal from the external apparatus and a UI information and may be provided as a panel such as a liquid crystal display (LCD), a plasma display panel (PDP), an organic light emitting display (OLED), etc. The display 60 includes a video signal processor (not shown) to process a video signal into a signal with a suitable format for the foregoing panels.

The controller 21 performs an identification data checking process if an error checking command is input through the user input unit 40. Then, the controller 21 controls the UI generating unit 50 to display a result from the identification data checking process on the display 60. Hereinafter, a control method by the controller 21 will be explained with reference to FIG. 3.

If an error checking command is input from the user input unit 40 (S10) or a predetermined period elapses, the controller 21 determines whether an external apparatus is connected to the display apparatus 200 via the external apparatus connecting part 30 (S20). If the external apparatus has a graphic card which supplies a digital video signal, it can have access to the storage unit 11, as described above, and may input/output data through the external apparatus connecting part 30 during an identification data checking process. In this case, the controller 21 may only keep communicating with the storage unit 11 and block access of the external apparatus through the external apparatus connecting part 30 so as to prevent from occurring of errors due to other communications. If the external apparatus is connected, the controller 21 displays a message on the display 60 to release a cable where the external apparatus is connected or forces the external apparatus not to have access to the storage unit 11 (S21). The user may detach the external apparatus from the display apparatus 200 on the message displayed on the display 60.

Then, the controller 21 calculates an inspective check data from the display identification data stored in the storage unit 11 by a data processing method (S30). In the present exemplary embodiment, the controller 21 performs an exclusive logical sum (XOR) to calculate a data corresponding to the display identification data and to get an inspective check data.

The controller 21 determines whether the calculated inspective check data matches the comparative check data, thereby deciding whether there is an error in the display identification data (S40).

Figure 4A:
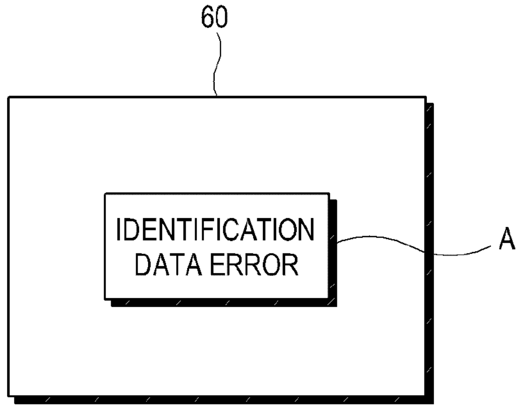
FIGS. 4A and 4B illustrate an error notice window in the display apparatus according to the second exemplary embodiment of the present invention.
Figure 4B:
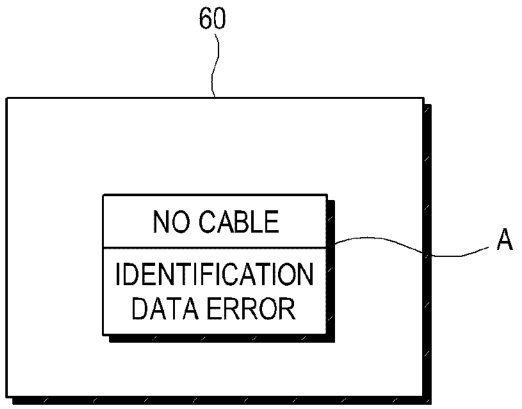

If the inspective check data does not correspond to the comparative check data, it is determined that an error occurs in the display identification data, and accordingly the controller 21 controls the UI generating unit 50 to display an error reporting window (A) as a UI information on the display 60 (S50). FIGS. 4A and 4B illustrate an error reporting message displayed on the display 60. An error reporting window (A) in FIG. 4A displays a message of "identification data error" only, and an error reporting window (A) in FIG. 4B displays a sign of "NO CABLE" to report that a cable of an external apparatus is not connected to the display apparatus 200 in addition to the message of "identification data error."

On the contrary, if the inspective check data matches the comparative check data, it is determined that an error does not occur in the display identification data, and accordingly the controller 21 controls the UI generating unit 50 to display a UI information which reports that the display identification data is normal on the display 60 (S60).

Figure 5:
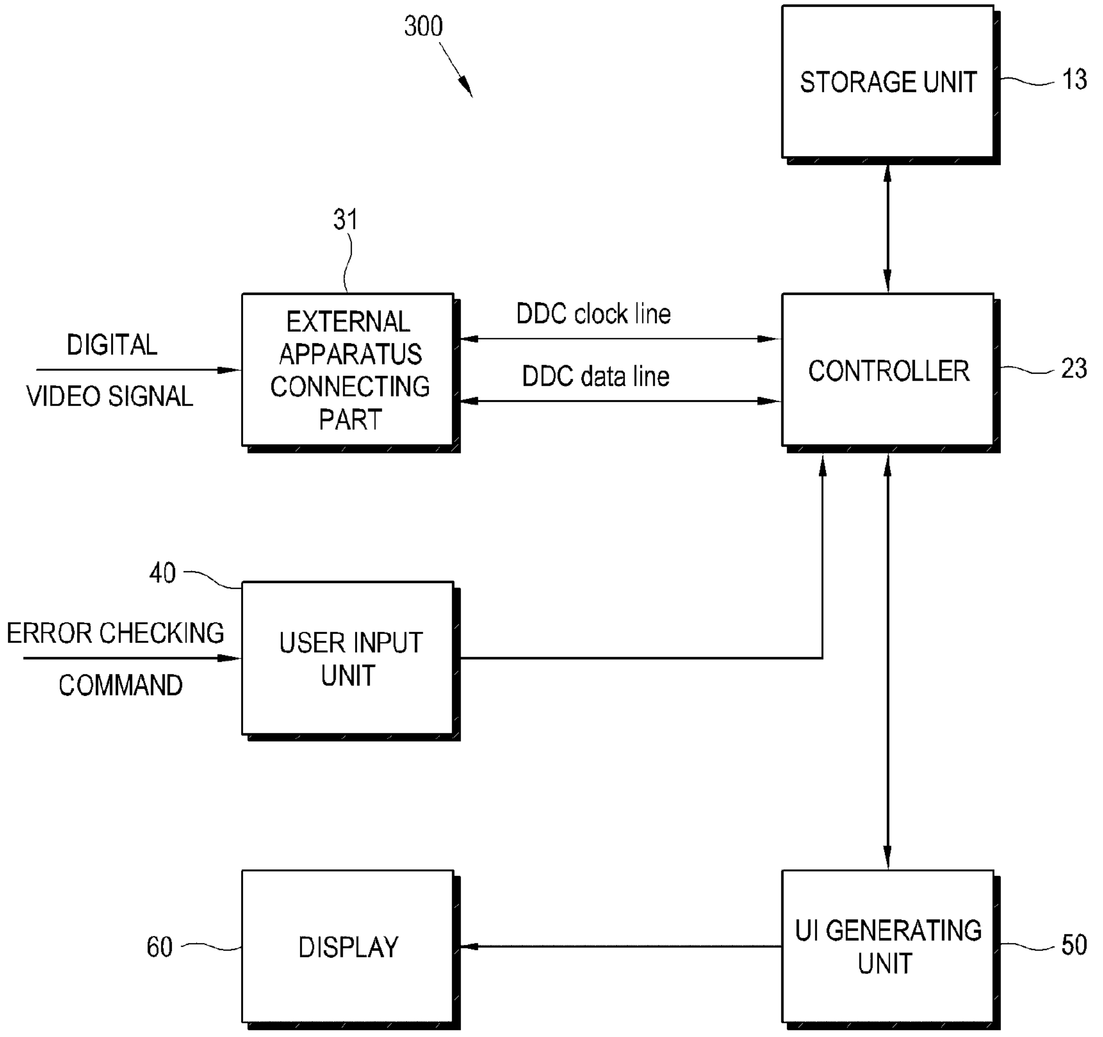
FIG. 5 is a control block diagram of a display apparatus according to a third exemplary embodiment of the present invention.
Figure 6:
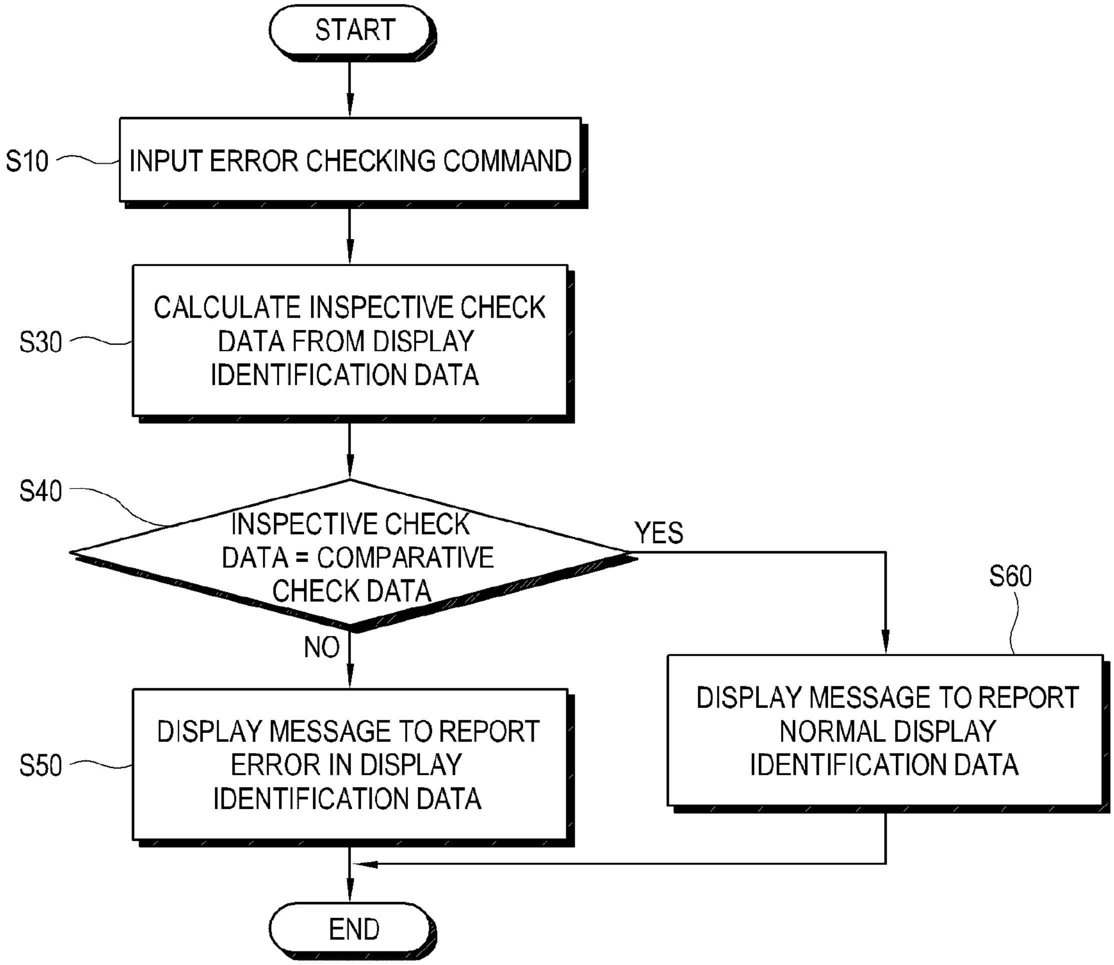
FIG. 6 is a flow chart illustrating a control method of the display apparatus according to the third exemplary embodiment of the present invention.

FIG. 5 is a control block diagram of a display apparatus according to a third exemplary embodiment of the present invention and FIG. 6 is a flow chart illustrating a control method of the display apparatus according to the present exemplary embodiment.

The display apparatus 300 according to the third exemplary embodiment receives an analog video signal from an external apparatus connecting part 31. The external apparatus connecting part 31 includes a digital visual interface-digital and analog (DVI-I) connector or a digital visual interface-analog only (DVI-A) connector.

In this case, a controller 23 transmits a display identification data in a storage unit 13 to an external apparatus via the external apparatus connecting part 31. That is, the storage unit 13 in the present exemplary embodiment provides the display identification data to the external apparatus through the controller 23 and does not communicate directly with the external apparatus connecting part 31, unlike the storage unit 10 in the first exemplary embodiment. Except for communications between the controller 23 and the storage unit 13 or the external apparatus connecting part 31, the controller 23 performs the same identification data checking process in the aforementioned exemplary embodiments.

To sum up with reference to FIG. 6, if an error checking command is input (S10), the controller 23 calculates an inspective check data from the display identification data (S30). Then, the controller 23 determines whether the inspective check data matches the comparative check data (S40).

If the inspective check data does not correspond to the comparative check data, the controller 23 displays a message to report an error in the display identification data on the display 60 (S50). If the inspective check data matches the comparative check data, the controller 23 displays a message to report that the display identification data is normal on the display 60 (S60).

In the present exemplary embodiment, the controller 23 does not need to determine whether the external apparatus is connected to the display apparatus 300.

Figure 7:
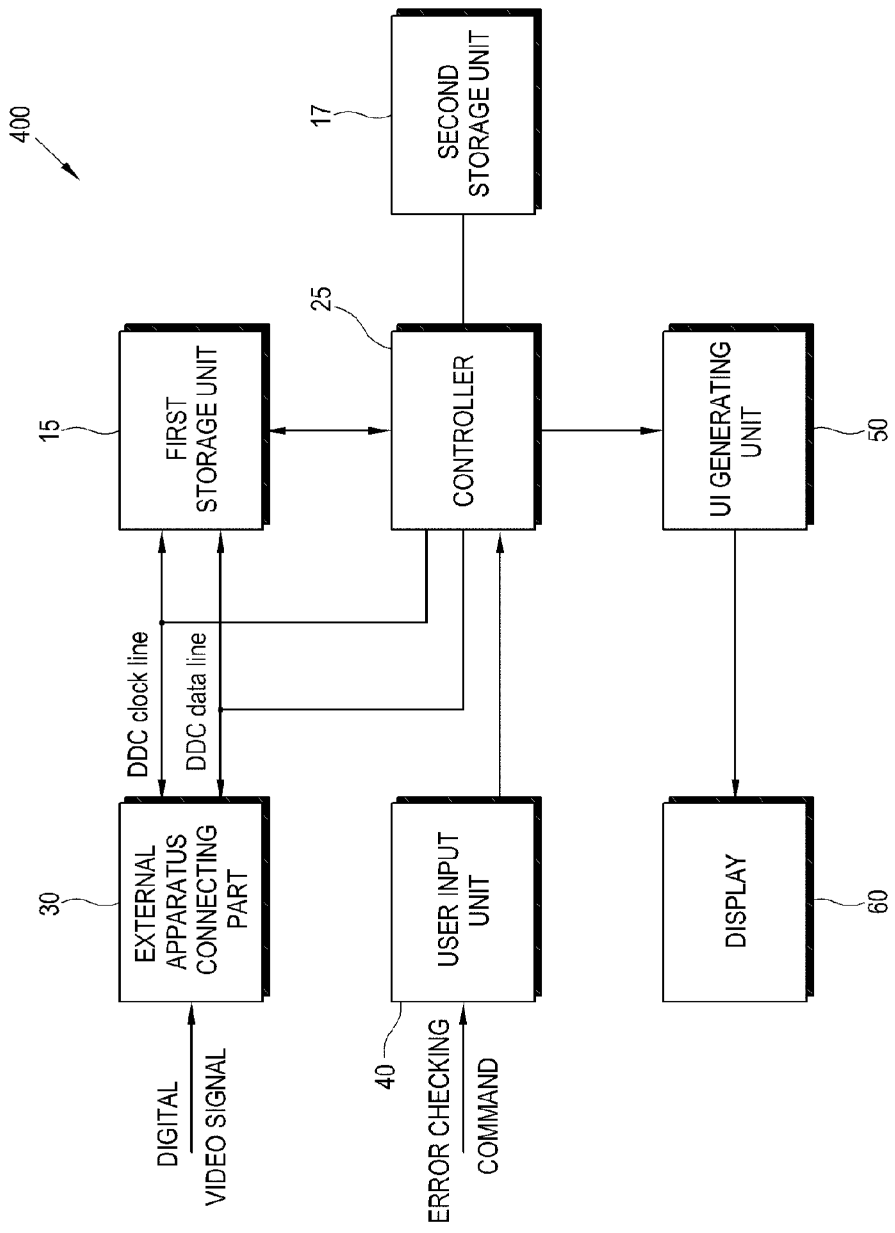
FIG. 7 is a control block diagram of a display apparatus according to a fourth exemplary embodiment of the present invention.
Figure 8:
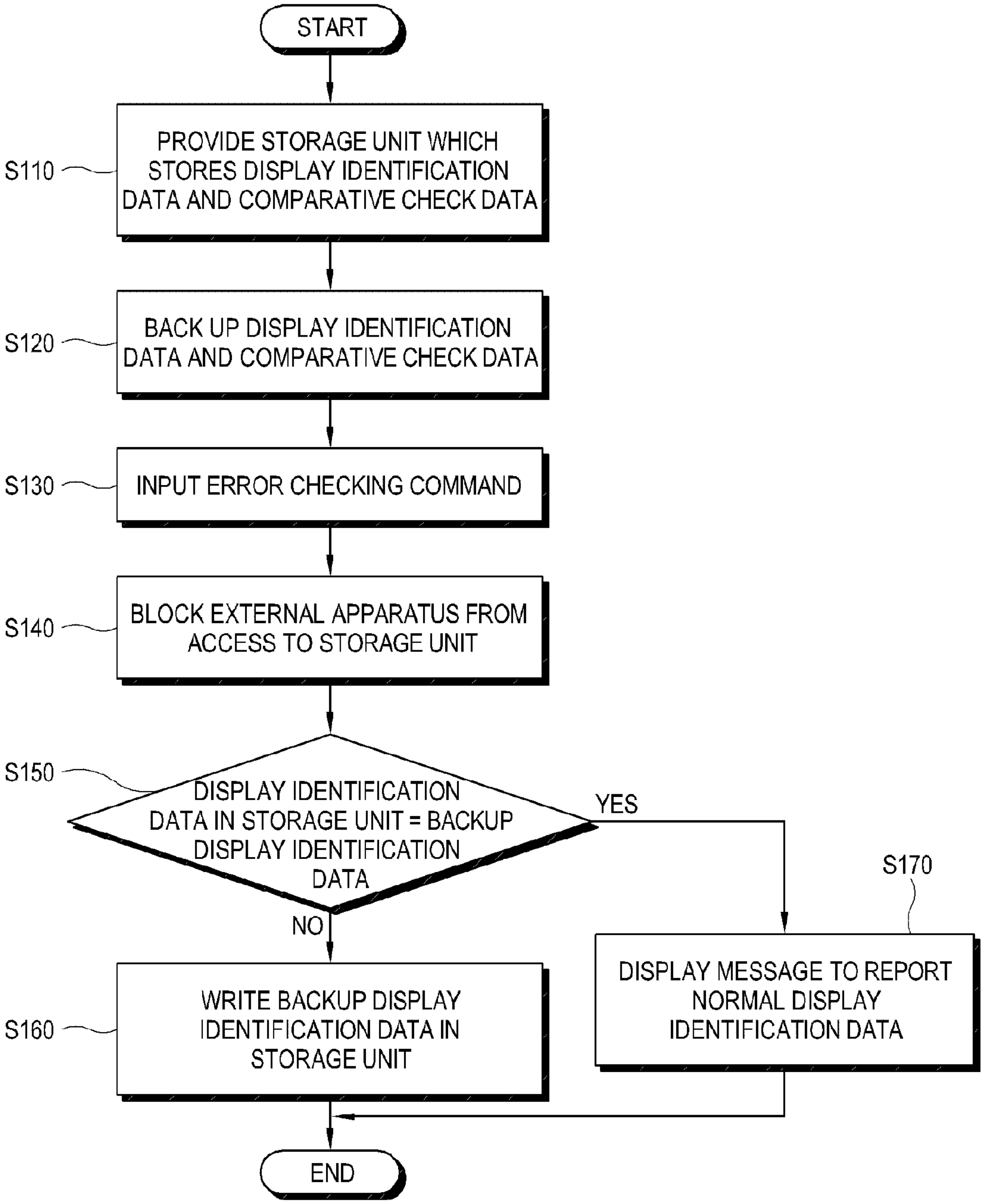
FIG. 8 is a flow chart illustrating a control method of a display apparatus according to the fourth exemplary embodiment of the present invention.

FIG. 7 is a control block diagram of a display apparatus according to a fourth exemplary embodiment of the present invention and FIG. 8 is a flow chart illustrating a control method of the display apparatus according to the present exemplary embodiment.

The display apparatus 400 according to the fourth exemplary embodiment includes a first storage unit 15 and a second storage unit 17 which stores a display identification data and a comparative check data. The first storage unit 15 and the second storage unit 17 may be provided as an electrically erasable and programmable read-only memory (EEPROM) or the like, and a protection function is set up for the storage units 15 and 17.

The display identification data and the comparative check data in the second storage unit 17 are the data which a controller 25 backs up when an external apparatus is connected to the display apparatus 400 and requests the display identification data at first. That is, the storage unit 17 stores an initial display identification data and an initial comparative check data where an error does not occur.

The first storage unit 15 is connected to an external apparatus connecting part 30 to provide the display identification data to the external apparatus, while the second storage unit 17 is not directly connected to the external apparatus. That is, the external apparatus may have direct access to the first storage unit 15 but is blocked to access to the second storage unit 17. Thus, a data in the first storage unit 15 connected directly to the external apparatus connecting part 30 may be damaged or produce an error by the external apparatus, but a data in the second storage unit 17 is hardly to produce an error. In other words, the display identification data in the first storage unit 15 may be changed from an initial display identification data, while the display identification data in the second storage unit 17 maintains an initial backup display identification data which can be served as a reference value to determine whether an error occurs.

Alternatively, the display identification data and the comparative check data are not backed up by the controller 25 to be stored in the second storage unit 17, but the same data as the display identification data and the comparative check data in the first storage unit 15 are stored in the second storage unit 17 when the display apparatus 400 is manufactured.

The control method of the display apparatus 400 according to the present exemplary embodiment will be described with reference to FIG. 8.

The first storage unit 15 is provided to store the display identification data and the comparative check data is provided (S110). If the display identification data is requested for the first time by the external apparatus, the controller 25 backs up the display identification data and the comparative check data stored in the first storage unit 15 into the second storage unit 17 (S120).

Then, if an error checking command is input via user input unit 40 (S130), the controller 25 blocks access of the external apparatus to the first storage unit 15 (S140).

Here, referring to FIG. 3, a user interface information to report that a cable is released may be provided to the user.

The controller 25 compares the display identification data stored in the first storage unit 15 with the backup display identification data in the second storage unit 17 and determines whether they are matched with each other (S150).

If the display identification data in the storage units 15 and 17 do not correspond to each other, the controller 25 determines that an error occurs in the display identification data and writes, i.e., restores, the backup display identification data in the second storage unit 17 into the first storage unit 15 (S160). Namely, the controller 25 recovers a display identification data where an error occurs using the backup display identification data. In the present exemplary embodiment, since the controller 25 not only determines whether there is an error in a display identification data but also recovers the display identification data with the error, the display apparatus 400 displays a video signal normally. Owing to the foregoing function of the controller 25, a user may easily solve problems of the display apparatus 400 of not displaying a video signal normally due to an error in the display identification data without asking a manufacturer.

If the display identification data stored in the storage units 15 and 17 are matched with each other, the controller 25 controls a UI generating unit 50 to display a user interface (UI) information to report that the display identification data is normal on the display 60 (S170).

The controller 25 may calculate an inspective check data and determines whether there is an error in the display identification data without comparing the display identification data stored in the storage units 15 and 17 with each other, as in the foregoing exemplary embodiments.

In the present exemplary embodiment, a control method of the display apparatus 400 receiving a digital video signal is illustrated, but the same control method is applicable to a display apparatus receiving an analog video signal. The controller 25 may store the backup display identification data in the first storage unit 15 after determining whether an error occurs in the display identification data.

Alternatively, the display apparatus 400 does not include the additional second storage unit 17 and the controller 25 backs up the display identification data and the comparative check data in a storage unit provided in the controller 25. That is, it may not be necessary to provide the second storage unit 17 as a separate storage unit from the controller 25. Also, the first storage unit 15 and the second storage unit 17 may be provided in a single configuration. That is, the storage units 15 and 17 may not be provided separately as long as they are formed into two independent regions which can communicates with the controller 25 through different accessibilities to an external apparatus.

Alternatively, the display apparatus 400 includes a storage unit which stores both a display identification data on a digital video signal and a display identification data on an analog video signal, and outputs a corresponding display identification data to an input video signal to the external apparatus. In this case, the display apparatus 400 backs up the respective display identification data in an additional storage unit which the external apparatus can not access to, and then uses the necessary display identification data.

As described above, the present invention provides a display apparatus which is capable of easily determining whether an error occurs in display identification data and a control method of the same.

Also, the present invention is to provide a display apparatus which easily notifies a user of an error if the error occurs in display identification data and a control method of the same.

Further, the present invention provides a display apparatus which recovers display identification data where an error occurs and a control method of the same.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a storage unit which stores a display identification data and a comparative check data obtained from the display identification data stored when the display apparatus is manufactured;

an additional storage unit which stores a backup display identification data and a backup comparative check data copied from the storage unit; and a controller which generates an inspective check data from the display identification data currently stored in the storage unit, compares the generated inspective check data with the comparative check data stored in the storage unit, and replaces the display identification data and the comparative check data stored in the storage unit with the backup display identification data and the backup comparative check data stored in the additional storage unit if generated inspective check data differs from the comparative check data stored in the storage unit.

2. The display apparatus according to claim 1, further comprising an external apparatus connecting part which connects to an external apparatus to supply a digital video signal, wherein the controller blocks the external apparatus from access to a data in the storage unit via the external apparatus connecting part if the identification data checking process starts.

3. The display apparatus according to claim 2, further comprising a user input unit for input of an error check, wherein the controller performs the identification data checking process if the error checking command is input through the user input unit.

4. The display apparatus according to claim 2, wherein the controller determines whether there is the error in the display identification data every predetermined period.

5. The display apparatus according to claim 1, further comprising an external apparatus connecting part which connects to an external apparatus to supply an analog video signal, wherein the controller provides a data in the storage unit to the external apparatus via the external apparatus connecting part.

6. The display apparatus according to claim 1, further comprising:

a user interface generating unit which generates a user interface information to be displayed on a display unit, wherein the controller controls the user interface generating unit to display a result from the identification data checking process on the display unit.

7. The display apparatus according to claim 1, wherein the controller blocks an external apparatus from access to the additional storage unit.

8. The display apparatus according to claim 1, wherein the controller compares the display identification data in the storage unit with the backup display identification data in the additional storage unit and determines whether the error occurs in the display identification data.

9. The display apparatus according to claim 1, wherein the comparative check data comprises a checksum.

10. The display apparatus according to claim 1, wherein the display identification data comprises an extended display identification data (EDID).

11. A display apparatus comprising:

a first storage unit which stores a display identification data and a comparative check data obtained from the display identification data stored when the display apparatus is manufactured;

a second storage unit which backs up the display identification data and the comparative check data from the first storage unit; and a controller which performs an identification data checking process to determine whether there is an error in the display identification data currently stored in the first storage unit, and stores the display identification data and the comparative check data backed up in the second storage unit in the first storage unit if the error occurs.

12. The display apparatus according to claim 11, further comprising an external apparatus connecting part which connects an external apparatus to supply a video signal, wherein the controller blocks the external apparatus from access to the second storage unit.

13. The display apparatus according to claim 12, wherein the external apparatus connecting part provides a digital video signal, and the controller blocks the external apparatus from access to the first storage unit if the identification data checking process starts.

14. The display apparatus according to claim 11, wherein the controller calculates an inspective check data from the display identification data stored in the first storage unit, and compares the inspective check data with the comparative check data to inspect whether there is the error in the display identification data.

15. The display apparatus according to claim 11, further comprising a user interface generating unit which generates a user interface information to be displayed on a display unit, wherein the controller controls the user interface generating unit to display a result from the identification data checking process on the display unit.

16. A display apparatus comprising:

a storage unit which stores a display identification data and a comparative check data obtained from the display identification data stored when the display apparatus is manufactured;

a user interface generating unit which generates a user interface information to be displayed on the display; and a controller which determines whether there is an error in the display identification data stored in the storage unit, and controls the user interface generating unit to display a result from determining whether the error occurs in the display identification data on a display unit, wherein the controller generates an inspective check data from the display identification data currently stored in the storage unit, and compares the generated inspective check data with the comparative check data stored in the storage unit to determine whether there is the error in the display identification data.

17. The display apparatus according to claim 16, further comprising an additional storage unit which stores a backup display identification data and a backup comparative check data, wherein the controller replaces the display identification data and the comparative check data stored in the storage unit with the backup display identification data and the backup comparative check data stored in the additional storage unit if it is determined that the error occurs in the display identification data.

18. A control method of a display apparatus which comprises a storage unit which stores a display identification data stored when the display apparatus is manufactured, an additional storage unit which backs up the display identification data and the comparative check data from the storage unit before calculating an inspective check data, and a display, the method comprising:

generating the inspective check data from the display identification data currently stored in the storage unit;

checking the identification data which compares the generated inspective check data and the comparative check data to determine whether an error occurs in the display identification data; and storing the backup display identification data and the backup comparative check data in the storage unit if determined that the error occurs in the display identification data.

19. The control method according to claim 18, wherein the checking of the identification data is performed every predetermined period.

20. The control method according to claim 18, further comprising generating a user interface information so that a result from the checking of the identification data is displayed on the display unit.

21. The control method according to claim 18, wherein the display comprises an external apparatus connecting part; and the control method further comprises blocking an external apparatus access to the storage unit when the external apparatus connecting part is connected to the external apparatus.

22. The control method according to claim 21, further comprising generating a user interface information so that a result from the checking the identification data is displayed on the display unit.

* * * * *